Jan. 16, 1951
A. P. BRIETZKE
2,538,188
INDICATOR MECHANISM
Filed Nov. 14, 1945
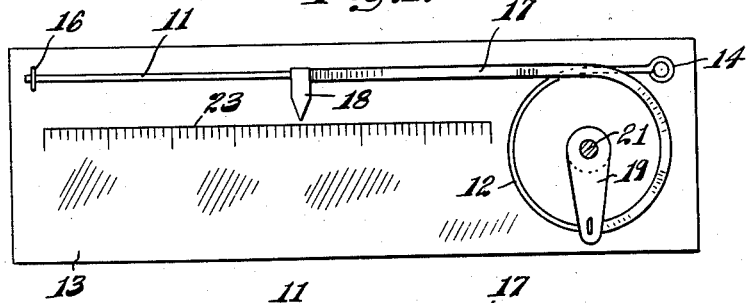
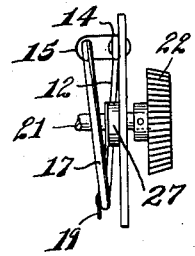
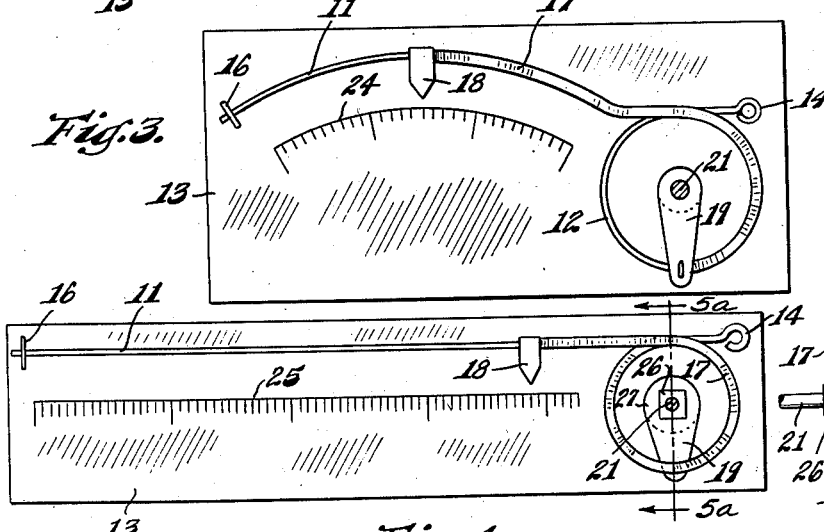
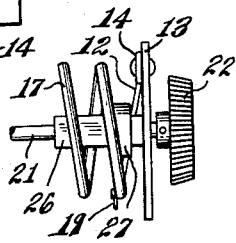
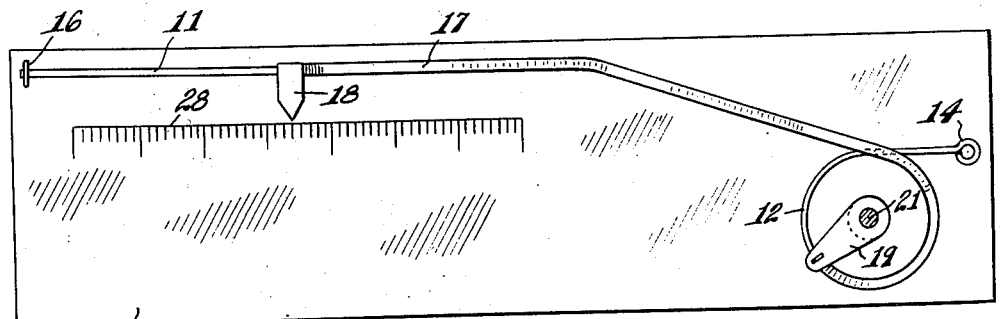
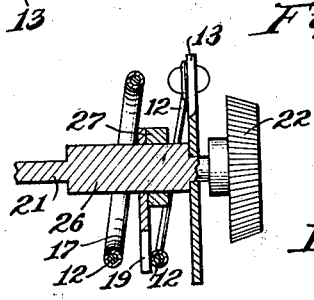
INVENTOR.
Adrian P. Brietzke.
BY
Bair & Freeman
Atty's.

Patented Jan. 16, 1951

2,538,188

UNITED STATES PATENT OFFICE 2,538,188

INDICATOR MECHANISM

Adrian P. Brietzke, La Crosse, Wis., assignor to Northern Engraving & Manufacturing Co., La Crosse, Wis., a corporation of Wisconsin Application November 14, 1945, Serial No. 628,412

4 Claims. (Cl. 116—135)

This invention relates to indicator mechanisms for radio, time clocks and the like, wherein a straight or slightly curved scale is desired, and where the pointer for the scale is actuated by the rotation of a tuning or setting knob.

It is an object of the invention to provide an improved and inexpensive mechanism for translating the rotary motion of a tuning or setting knob to straight line or slightly arcuate motion of a pointer.

It is another object of this invention to dispense with pulleys, cords, wires and the like in a mechanism of the type described and to minimize the parts that may break or get out of order.

It is also an object of the invention to eliminate the necessity for providing special means to prevent backlash in indicator mechanisms wherein taut cords, ribbons or chains are used as the driving means between a knob and pointer.

With these and other objects in view, my invention consists in the construction, arrangement and combination of the various parts of my indicator mechanism whereby the objects contemplated are attained, as hereinafter set forth, pointed out in the claims, and illustrated in the accompanying drawings, in which:

Figure 1 is a rear view of an indicator mechanism illustrating one embodiment of the invention.

Figure 2 is an end view of the indicator mechanism shown in Figure 1, as viewed from the right.

Figure 3 shows an indicator mechanism similar to that shown in Figure 1, wherein the pointer travels through an arcuate path.

Figure 4 is a rear view of another embodiment of the invention.

Figure 5 is an end view of the mechanism shown in Figure 4, as viewed from the right.

Figure 5a is a sectional view of the mechanism shown in Figure 5; and

Figure 6 is a rear view of still another embodiment of the invention.

Referring specifically to the drawing for a detailed description of the invention, and particularly to Figures 1 and 2, the numeral 11 is a round or square wire or guide, which is bent into a coiled, generally circular, shape at 12 and is fastened at the end of the coil 12 to a transparent panel or supporting member 13 by a pin or loop shown at 14. The wire or guide 11 is held slightly spaced from the panel 13 by small brackets 15 and 16. Wound around the wire and guide 11 and sliding freely on it is a flexible member 17 which is preferably a closely wound fine wire but may be formed by a braided sleeve or other flexible structure. A pointed 18 is attached to one end of the flexible member 17 and the other end of the flexible member 13 is connected to a radius arm 19 formed of spring material so it may assume various positions on the coil 12. The radius arm 19 is turned by a shaft 21 attached to a rotatable tuning or setting knob 22.

In the embodiment shown in Figures 1 and 2, a straight dial 23 is provided and since the wire or guide 11 is straight, the pointer 18 follows the dial when the knob 22 is rotated.

In Figure 3, a curved dial 24 is provided and the wire 11 conforms to the curvature thereof so that the pointer 18 follows the dial 24 as the knob is rotated.

In Figures 4, 5 and 5a, a straight wire 11 and dial 25 are provided, but the coil 12 is formed into a helix having more than one turn and a shaft 21 is provided with a square or keyed portion 26 which is utilized with a hub 27 having a matching opening, which hub 27 is free to slide longitudinally on the shaft 21. The hub 27 carries the radius arm 19. This construction is useful when the control shaft 21 must make more than one revolution to move the pointer 18 over the entire scale.

In Figure 6, a straight dial 28 and a straight wire 11 are provided and the same coil and radius arm as shown in Figures 1, 2 and 3 are disposed at a remote position from the dial 11.

From the foregoing, it will be apparent that I have provided an inexpensive indicator mechanism for radios, time clocks and the like, wherein the parts which may break or get out of order are minimized. It is also apparent that a pointer member may be dispensed with and the end of the flexible member 17 itself serve as a pointer.

Some changes may be made in the construction and arrangement of the parts of my indicator mechanism without departing from the real spirit and purpose of my invention, and it is my intention to cover by my claims any modified forms of structure or use of mechanical equivalents, which may be reasonably included within their scope without sacrificing any of the advantages thereof.

I claim as my invention:

1. An indicator device constructed as a unitary article, comprising, a rigid supporting member, a dial thereon, a pointer movable over the range of said dial, a substantially rigid wire guide member secured at its ends to said supporting member in spaced relation thereto, said wire guide member being of such rigidity as to sustain its own shape and position between its points of securement, said wire guide member terminating adjacent one end in a substantially round coil, a manually rotatable member mounted in said supporting member, and a flexible member engaging said guide member and attached at the coil end of the guide member to said rotatable member and at the other end to said pointer, said flexible member being slidable on and guided by said guide member and positioning said pointer with respect to said dial in response to movement of said rotatable member.

2. An indicator device constructed as a unitary article, comprising, a rigid supporting member, a dial thereon, a pointer movable over the range of said dial, a substantially rigid wire guide member secured at its ends to said supporting member in spaced relation thereto, said wire guide member being of such rigidity as to sustain its own shape and position between its points of securement, said wire guide member terminating adjacent one end in a substantially round coil, a manually rotatable member mounted in said supporting member, and a flexible member engaging said guide member and attached at the coil end of the guide member to said rotatable member and at the other end to said pointer, said flexible member being slidable on and guided by said guide member and positioning said pointer with respect to said dial in response to movement of said rotatable member, said flexible member comprising closely wound fine wire surrounding portions of said guide member and freely slidable thereon.

3. An indicator device constructed as a unitary article, comprising, a rigid supporting member, a dial thereon, a pointer movable over the range of said dial, a substantially rigid wire guide member secured at its ends to said supporting member in spaced relation thereto, said wire guide member being of such rigidity as to sustain its own shape and position between its points of securement, said wire guide member terminating adjacent one end in a helix of at least two turns, a manually rotatable member mounted in said supporting member, and a flexible member surrounding said guide member and attached at the coil end of the guide member to said rotatable member and at the other end to said pointer, said flexible member being slidable on and guided by said guide member and positioning said pointer with respect to said dial in response to movement of said rotatable member, said rotatable member having a portion movable axially of said helix and thereby adapted to follow successive turns of the helix.

4. An indicator device constructed as a unitary article, comprising, a rigid supporting member, a dial thereon, a pointer movable over the range of said dial, a substantially rigid small gauge guide member secured at its ends to said supporting member in spaced relation thereto, said wire guide member being of such rigidity as to sustain its own shape and position between its points of securement, said wire guide member terminating adjacent one end in a helix consisting of at least two turns, a manually rotatable member, a shaft mounted in said supporting member for rotating said rotatable member, a slidable keyed connection between the shaft and said rotatable member, whereby the rotatable member can slide axially on said shaft and follow the turns of said helix, and a flexible member surrounding said guide member and attached at the coil end thereof to said rotatable member and at the other end to said pointer, said flexible member being slidable on and guided by said guide member and positioning said pointer with respect to said dial in response to movement of said rotatable member.

ADRIAN P. BRIETZKE.

REFERENCES CITED

The following references are of record in the file of this patent:

UNITED STATES PATENTS

| Number | Name | Date |
|---|---|---|
| 2,232,057 | Faller et al. | Feb. 18, 1941 |
| 2,360,181 | Waltz | Oct. 10, 1944 |

FOREIGN PATENTS

| Number | Country | Date |
|---|---|---|
| 432,021 | Great Britain | Dec. 14, 1933 |
| 802,031 | France | May 30, 1936 |
| 846,027 | France | Nov. 15, 1938 |